Fig. 3.

UNITED STATES PATENT OFFICE.

THOMAS IRVING POTTER, OF PORTLAND, OREGON.

COMPUTING-MACHINE.

1,035,047.  Specification of Letters Patent.  Patented Aug. 6, 1912.

Application filed June 24, 1911, Serial No. 635,144. Renewed June 25, 1912. Serial No. 705,868.

*To all whom it may concern:*

Be it known that I, THOMAS IRVING POTTER, a citizen of the United States, residing at Portland, in the county of Multnomah and State of Oregon, have invented certain new and useful Improvements in Computing-Machines; and I do hereby declare the following to be a full, clear, and exact description of the same, reference being had to the accompanying drawings, forming a part of this specification, and to the figures and letters of reference marked thereon.

This invention relates primarily to machines designed for the computation of change in money transactions between a merchant and his customer, provision being made whereby the machine automatically ejects an amount corresponding to the difference between the purchase price and the amount deposited by the customer.

The objects of the invention are to simplify the mechanism for making the computations, as well as the mechanism for handling and ejecting the change, and at the same time increase both the accuracy, efficiency and capacity of the machine.

The machine of the present invention embodies in its organization a central device or selector having motions in two intersecting planes, the motion in one plane being controlled and determined by a group or set of keys corresponding to one set of factors, and the motion in the other plane being controlled and determined by a group or set of keys corresponding to another set of factors, any of which may be used in the computation. The control device or selector preferably has its surface of cylindrical form, divided into sections, each section corresponding to one of the possible combinations which can be formed by operating a key of each group, there being a section of the control device or selector for each possible combination which can be made in the manipulation of the machine, whereby permutation of the control means is avoided, as well as the necessity for movements of the same in opposite senses, as has in most instances been thought necessary in change computing machines.

The invention consists in certain novel details of construction and combinations and arrangement of parts, all as will be hereinafter described and pointed out particularly in the appended claims.

Referring to the accompanying drawings, Fig. 17 is a sectional elevation showing a modification of the ejecting mechanism.

Similar letters of reference in the several figures indicate the same parts.

The machine adopted for illustrating the present invention is one that may be said to have a limited capacity, inasmuch as it is designed only for computing and delivering change in increments of one unit, say, one dollar, up to and including nine units or dollars. That is to say, the machine, upon the deposit of nine dollars, or any number of dollars less than nine, and the purchase of goods of the value of an even dollar or dollars up to eight dollars, is adapted to return to the purchaser a proper amount of change. It will be understood, however, that the principles and, in fact, the mechanism itself may be utilized in machines having any desired capacity, either by extending the number of keys, and coin receptacles with control mechanism therefor, or by utilizing mechanism, such as herein illustrated, as one unit in an organized machine embodying a plurality of such units adapted to handle amounts in increments on the decimal system.

Referring to the accompanying drawings, it will be seen that the machine embodies a keyboard having two groups or rows of keys numbered from 1 to 9, inclusive, one of said rows having keys to correspond to the amount deposited by the purchaser, and the other of said groups or rows having keys to correspond to the amount of the purchase.

The deposit keys are indicated by the letter A, and the purchase keys by the letter B. Each group of keys is adapted to primarily control the positioning of the control of selector mechanism in one plane or direction, the plane of the movement controlled by one group being at substantially right angles to the plane of movement controlled by the other group. At one side of the keyboard there is mounted a group of coin receptacles or stacks, which in the particular machine illustrated comprises three stacks indicated by the reference letters C, C, C', adapted to contain silver dollars and one indicated by the reference letter $C^2$ adapted to contain five dollar gold pieces. The coins are adapted to be discharged from the bottom of the stacks into a chute or receiver $C^3$, shown in front elevation in Fig. 1, by mechanism which will be hereinafter described.

Figure 1:
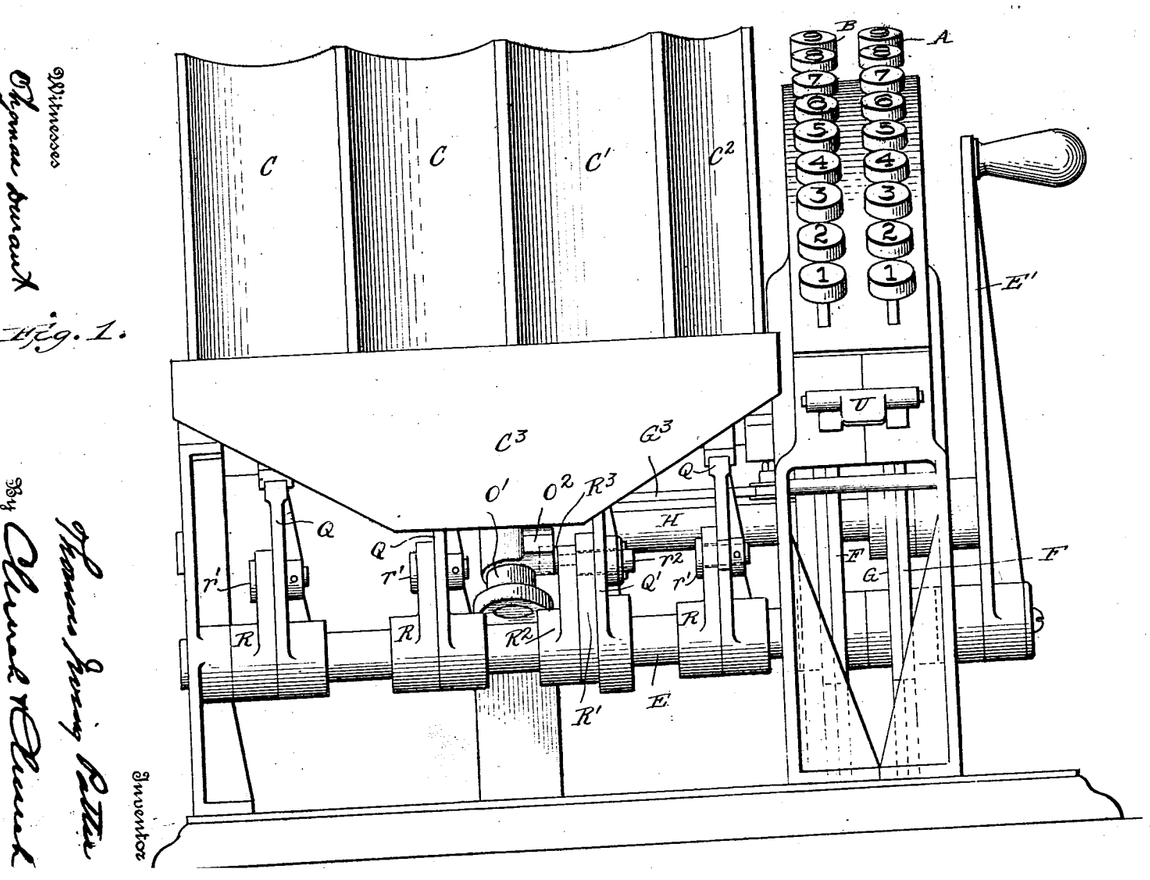
—Figure 1 is a front elevation of a change making or computing machine embodying the present improvements.
Figures 4, 18:
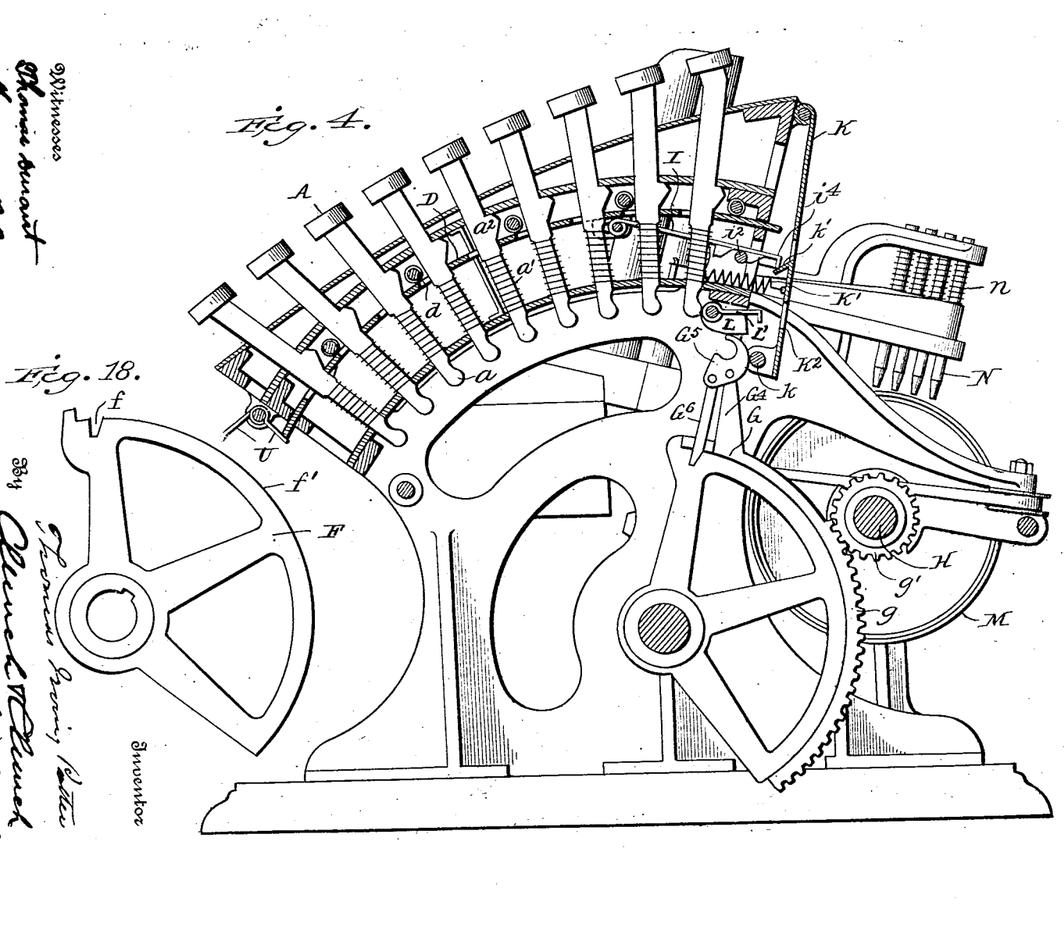
Fig. 4 is a sectional view in a vertical plane showing one bank of keys and the mechanism controlled thereby in side elevation.
Fig. 18 is a side elevation of one of the segmental spacer arm actuators.
Figure 4:
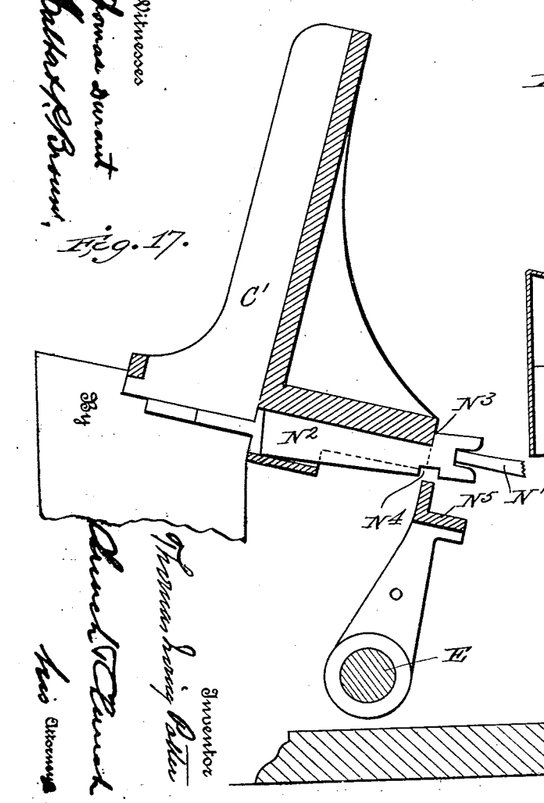

In the preferred arrangement of the groups of keys, as shown in Figs. 1 and 4, they are in the form of parallel proximate rows, and the keys of each row, as shown in Fig. 4, are mounted in the frame of the machine so as to slide inwardly, preferably in substantially radial lines, so that the inner rounded ends $a$ of any one of them may be made to project inwardly beyond the general plane or line of the group. Each key is normally held out by a spring $a'$, and each bears on one edge a projection or tooth $a^2$ adapted to displace and pass beneath a spring pressed or gravitating key lock or retaining slide D. The retaining slide or key lock D for each group of keys is preferably segmental in form and the apertures $d$ therein, through which the keys pass, are so positioned with relation to each other and with relation to the keys that upon the depression of any key the said lock will drop back above the tooth $a^2$ and retain the key in its depressed position. Should any other key of the group be operated it will, in moving the key lock plate D, release the key first operated, thus preventing the retention of more than one key in depressed position at one time.

Figure 2:
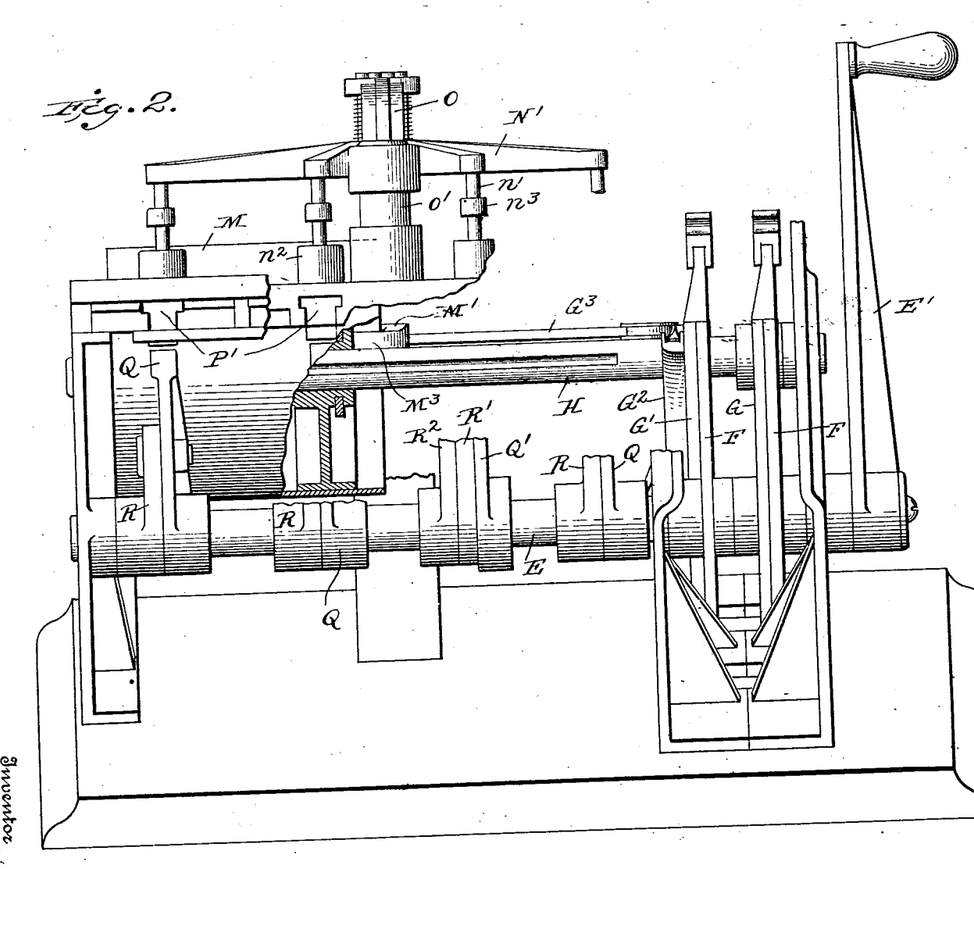
Fig. 2 is a perspective view looking at the front of the machine, but with the coin stacks and chute, together with the keyboard removed and parts broken away to show underlying parts.

On the main operating shaft E journaled in the frame at approximately the point from which the keys radiate, are keyed a pair of segmental spacer arm actuators F (Figs. 2 and 18), and journaled on said shaft beside each of the segments F is a spacer arm segment. The segment G for coöperating with the deposit keys has upon its periphery, a segmental rack $g$ which meshes with a pinion $g'$ on the selector shaft H. The segment G' which coöperates with the purchase keys (Figs. 2 and 10 to 12) is provided on one side with a segmental sheave $G^2$ to which a flexible connection such as a metal tape $G^3$ is attached for the purpose of moving the selector in one direction, as will be presently described. Each of the segments G and G' is provided with a radial arm $G^4$ having pivotally mounted thereon a key engaging dog $G^5$ which is adapted to strike and be turned by a depressed key into position to lock the key and segment together. The dogs $G^5$ have connected to them a radially movable bolt $G^6$ guided at its inner end by the segment and adapted to move into or out of a slot or recess $f$ (Fig. 18) in the segmental spacer arm actuater, so as to lock the spacer arm actuator and spacer arm segment together, except when the dog is swung by engagement with a key so as to release the bolt from the recess $f$. When so released the actuator F is free to advance, leaving the spacer arm segment locked to the depressed key and the concentric surface $f'$ of the actuator F, by coöperation with the end of the bolt $G^6$ will prevent the disengagement of the dog and key until the parts are returned to their initial relative position, where the bolt may again enter the recess $f$. Mechanism of this general character is known and further detail description of the same would seem to be unnecessary for a complete understanding of the present invention.

Figure 7:
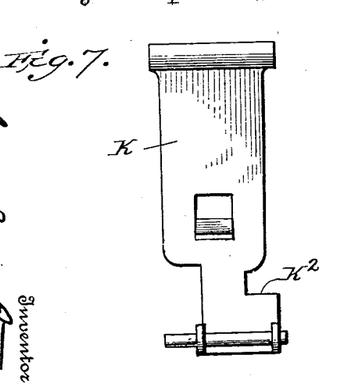
Fig. 7 is a detail of the automatic release lever for the key lock.
Figure 8:
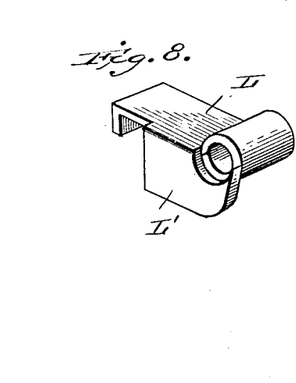
Fig. 8 is a detail perspective view of the release lever catch.
Figure 9:
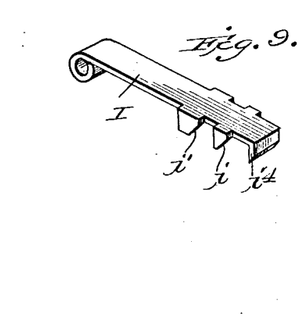
Fig. 9 is a similar view of the release lever pawl.

In the present machine, provision is made whereby, when a key has been depressed, and the actuator advanced from its normal position to cause the dog to engage with a key, operation of other keys of the group will be prevented, and when the actuator and dog return to normal position, the operated key will be released and allowed to return to its elevated position under the influence of its spring. The mechanism for accomplishing these ends will be best understood by reference to Figs. 4 and 7 to 9, inclusive. The key lock plate D for each group of keys is near its upper end provided with a pivoted release lever pawl I, shown in detail in Fig. 9, the pivotal connection between the pawl and plate D being preferably a loose connection, whereby the parts are permitted a limited independent bodily movement. The pawl I is provided with two projections $i$, $i'$. The projection $i'$ has an inclined forward edge and is adapted, when the plate D is advanced, to ride up on a cross pin $i^2$ upon which the forward end of the pawl normally rests. The extreme end of the pawl is in the form of a hook $i^4$ adapted to pass through an aperture in and engage an automatic lock and release lever K, (Fig. 7) pivoted at its upper end to the frame of the machine and extending down in position for a cross pin $k$ on its lower end to be struck by the dog $G^5$ when the dog is in its normal position, as shown in Fig. 4. In this position of the parts, the hook $i^4$ of the pawl is adapted to ride on an incline $k'$ on the release lever, but the movement of the key lock D under the influence of any one of the keys does not advance the same sufficiently far for the hook to engage the lever, but should the lever be allowed to swing inwardly under the influence of its spring K', the pawl would pass through the aperture in the lever and the latter would be locked thereto. When so locked, the lever rests against the end of the key lock D, and prevents the key lock from being advanced, as by the depression of another key. In order to lock the lever in this position a release lever catch (Figs. 4 and 8) indicated by the letter L is pivoted on the frame of the machine and adapted to hook over a shoulder $K^2$ on the release lever whenever the latter is allowed to swing in by the movement of the dog $G^5$ away from the same. The dog $G^5$ normally rides under a projection L' on the catch so as to hold the same elevated, and so as to release it whenever the dog returns to its initial position.

In operation, it will be understood that when a key is depressed the lock plate D drops back into position above the projection $d^2$ on the key and when the actuating segment and dog $G^5$ is advanced the release lever moved into position to engage with the pawl I and the catch L drops down over the shoulder $K^2$ so as to hold the release lever in locking position. Upon the return of the dog $G^5$ to the position shown in Fig. 4, it first lifts the catch and then by its engagement with the pin $k$ on the release lever, swings the lever out to the position shown in Fig. 4, carrying with it the pawl I and lock plate D. The advance of the lock plate D releases the depressed key, and the inclined projection $i'$ on the pawl, riding up on the pin $i^2$, disengages the pawl from the lever and the parts immediately resume the position shown in Fig. 4.

The mechanism for locking and releasing the keys, it will be understood, is duplicated for each group of keys, inasmuch as it is preferred that each group of keys shall be entirely independent of the other group in so far as the operation of locking and release are concerned.

Figure 3:
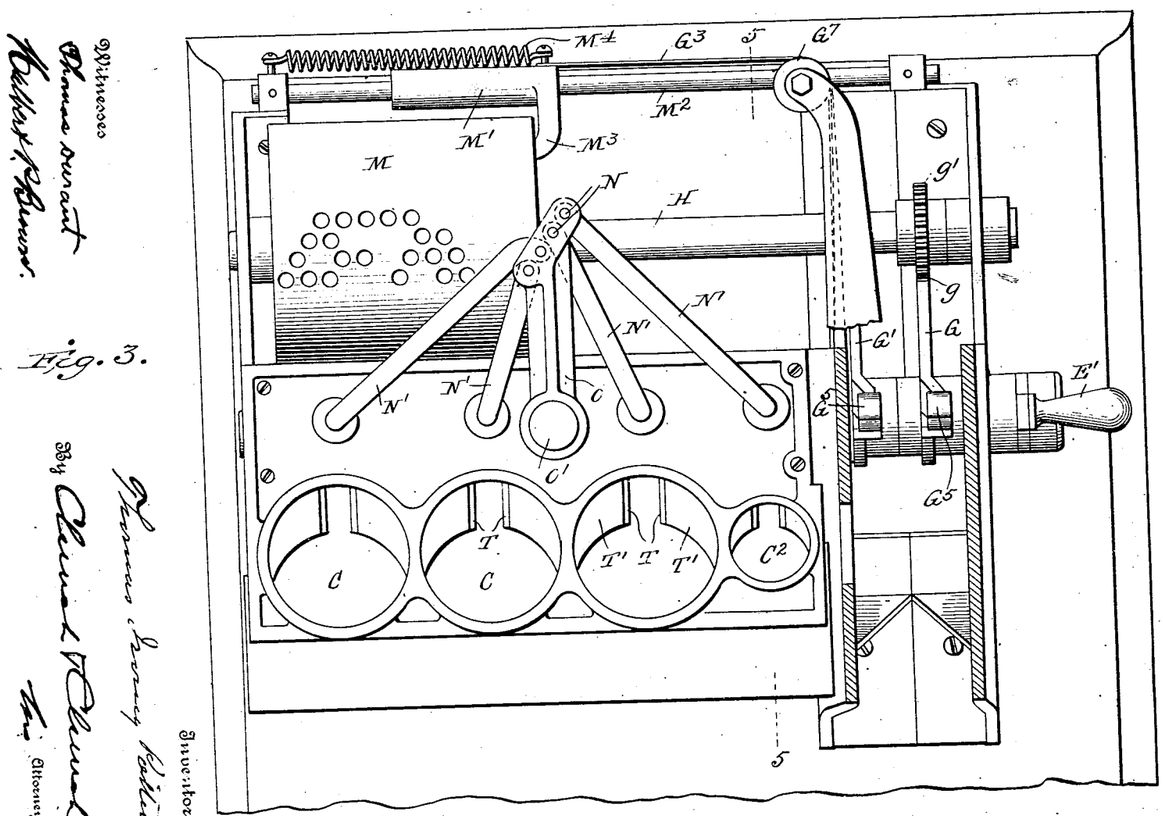
Fig. 3 is a top plan view with the keyboard removed and some of the parts broken away and in section.

The shaft H, before referred to, is journaled in the frame substantially parallel with the shaft E and upon it there is keyed, so as to slide freely, the control device or selector, preferably in the form of a cylinder M, which, as it rotates in unison with the shaft, will be positioned angularly through gear or pinion $g'$ and rack or segment $g$, in accordance with the position of the actuating segment. The selector M is normally held in its position at one end of the shaft H by a spring or yielding pressure mechanism which may assume various forms, but is preferably a spring pressed carriage M' mounted on a shaft $M^2$ and connected with the selector by an arm $M^3$, best seen in Fig. 5, the end of which works in a groove or bearing at one end of the selector. A coil spring $M^4$ serves to hold the carriage and selector at one extreme of their movement. The flexible connection $G^3$ before referred to, is connected to the carriage at one end, as seen in Fig. 3, passes around a pulley $G^7$ and at the other end is connected with the sheave segment $G^2$. It serves to advance the carriage against the tension of spring $M^4$, and to position the selector longitudinally of the shaft, in accordance with the angular movement of the actuating segment $G'$ as determined by the engagement of its dog with the operated key of the group of purchase keys.

From the foregoing it will be seen that the selector may be positioned both angularly and longitudinally of its axis in accordance with the actuated key of the two groups. Thus it becomes possible to position the actuator differently for each possible combination of the keys of the groups, and by dividing the surface of the actuator into sections corresponding to these positions, and providing means for coöperating with the surface or with the formation of the surface in the particular section, an effective control may be provided through simple mechanical appliances, but with a very large capacity in so far as the possible number of different combinations which may be effected by the groups of keys is concerned.

Figure 6:
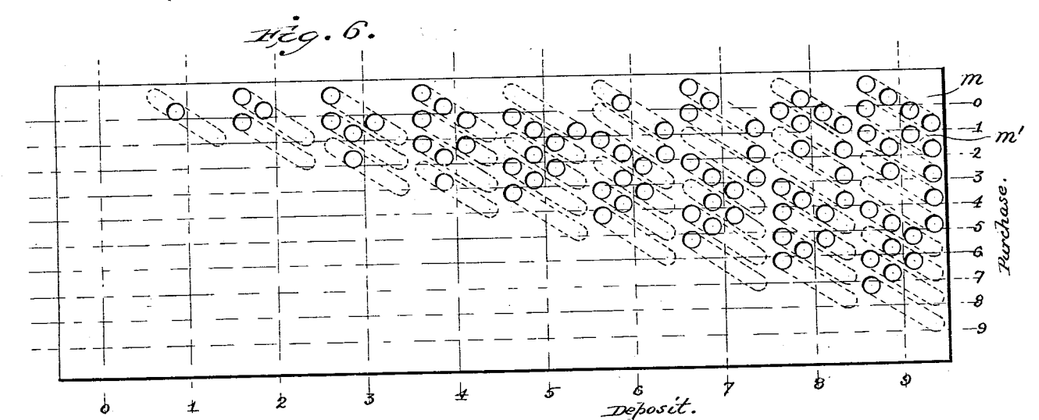
Fig. 6 is a plane projection of the surface of the control device or selector showing the apertures pertaining to each section of the surface in their proper relative positions.

In the preferred construction, apertures are provided in the surface of the selector into which pins may enter for the operation or control of the operation of the coin ejecting mechanisms. A plane projection of the simple form of selector cylinder of the present machine is shown in Fig. 6, and in this figure of the drawing the positions to which the cylinder or selector is moved under the control of the two groups of keys, are indicated by dotted lines, the transverse dotted lines corresponding to the angular positioning of the selector, are numbered in accordance with the keys of the deposit group of keys. The longitudinal dotted lines indicate the positions controlled by the purchase group of keys, and are correspondingly numbered. The intersections of the dotted lines on Fig. 6 indicate the number of possible combinations or positions to which the selector might be adjusted or controlled by the two sets or groups of keys, but in the practical embodiment of the machine illustrated it is not necessary to utilize all of these combinations for the reason that in a money transaction the deposit must always exceed the purchase, if there is to be a return of any change, and consequently, in all positions where the deposit would only equal or be less than the purchase, the surface of the selector is left blank.

In locating the apertures in each position to which the selector may be adjusted, said apertures are preferably arranged in diagonal lines above and below the intersection of the center of the positions indicated by the dotted cross line, thus, for instance, as shown in Fig. 6, the diagonal rows of apertures inclosed by the diagonal dotted lines constitute one group. Each group of apertures is inclosed by a diagonal dotted line, so that the several spaces may be easily distinguished from each other and to show that the selector is subdivided into spaces or sections corresponding to the positions to which the selector may be adjusted.

For coöperation with the selector there is mounted above the same a group of four pins N, said pins being slidably mounted in a frame O and normally held down or in projected positions by coil springs $n$. The frame O is mounted on the upper end of a shaft O' which may be conveniently termed a lock depressor shaft, said shaft extending down approximately to the shaft E and having mounted thereon a cam $O^2$, Figs. 14 and 15 for depressing the shaft, frame O and pins periodically, as will be hereinafter explained. If, when the pins are depressed or moved down toward the selector, an aperture or apertures be in line therewith, they will enter said apertures and move down with the frame O, but if no aperture be in position they will be arrested by the surface of the selector and held up in inoperative position. Each pin N has an arm N' connected thereto, and said arms, are utilized as the means whereby the ejection of the proper coins for the change to be given a customer is controlled. Various arrangements for accomplishing this end will at once suggest themselves, and in the drawings, particularly in Figs. 5 and 17, two forms of mechanism are shown.

In Fig. 17 the end of each arm N' works in the slotted rear end of a pusher or coin ejector slide $N^2$. Said slide $N^2$ is normally held with its rear end elevated and with its shoulder $N^3$ against a fixed portion of the frame, whereby the slide is held against being advanced. When the arm N' is depressed, as by its pin moving into one of the apertures in the selector, it carries the rear end of the slide $N^2$ with it, disengaging the shoulder $N^3$ and moving the notch $N^4$ of the slide into engagement with a reciprocatory actuator $N^5$ mounted on the shaft E. Oscillation of the shaft E will therefore carry the slide forward and discharge a coin or coins from the coin stack through the bottom of which the slide works. As the slide advances it moves away from the arm N' and is held in engagement with the actuator $N^5$ by its rear end passing beneath the guide surface in which the slide works.

Figure 5:
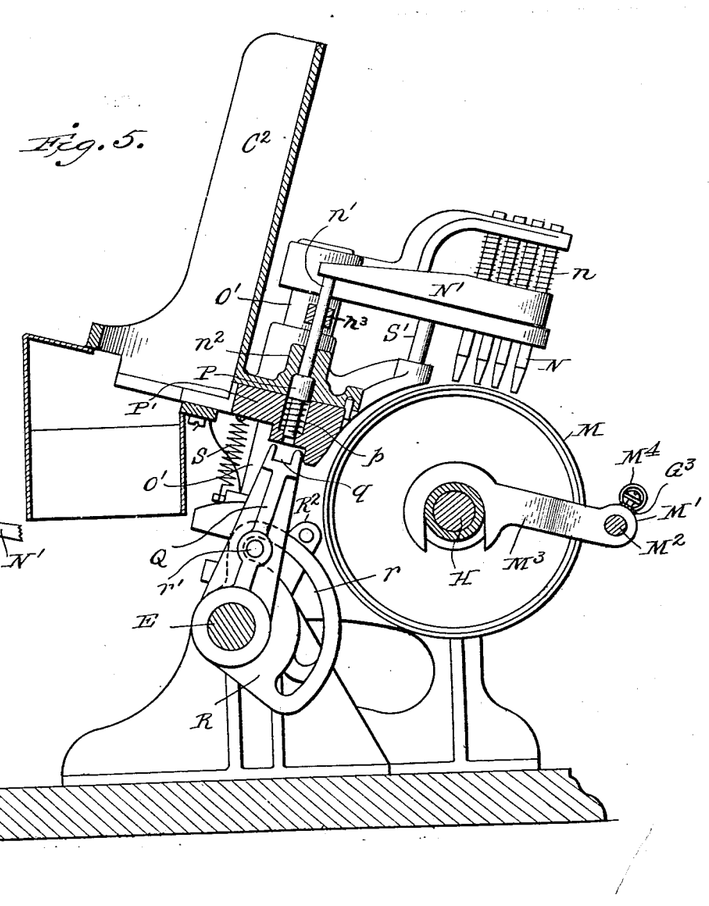
Fig. 5 is a vertical section substantially on the line indicated at 5—5, Fig. 3, looking toward the left.

In Fig. 5 and in the other figures of the drawing, each of the arms N' terminates in a downwardly extending pin $n'$, each adapted to slide in an aperture $n^2$ formed in the frame of the machine, or in a portion of the base of the coin stacks, and each provided with a collar $n^3$ for limiting its downward movement. The lower ends of the pins bear on the heads of locking pins P, each mounted in a coin ejecting slide P', but adapted to be projected by its spring $p$ so as to normally enter the fixed frame and lock the slide against movement in either direction. When depressed by the pin $n'$ the locking pin will occupy a position with its upper end or surface in line with the upper surface of the slide and consequently the slide is then free to be advanced for the ejection of a coin. The locking pin moves away from the pin $m$ and beneath the surface of the guideway for the slide, whereby the locking pin is held depressed until the slide or ejector again returns to its normal position. The action is quite similar to that of the action of the tumbler pins in the well known Yale lock. In the present instance, however, the locking pins are also utilized as the means whereby the slides or ejectors are located or connected to their actuating devices. Thus, on the shaft E there is journaled a series of arms Q, Q', each having a recess or slot $q$ in its upper end into which the lower end of the locking pin P of the particular slide to be operated by the actuator is adapted to enter when depressed by the arms N', $n'$, as before explained. The arms Q, Q', are oscillated or moved by the shaft E, but inasmuch as said shaft also constitutes the motive power for positioning the selector, and for depressing the pins N, which movements must be completed before the arms are moved, loose driving connections are provided between the shaft E and said arms Q, Q'. These loose connections may conveniently take the form of slotted segments R keyed to the shaft and into the slots $r$ in which pins $r'$ in the arms Q project.

Figures 10, 11, 12, 13, 14, 15, 16:
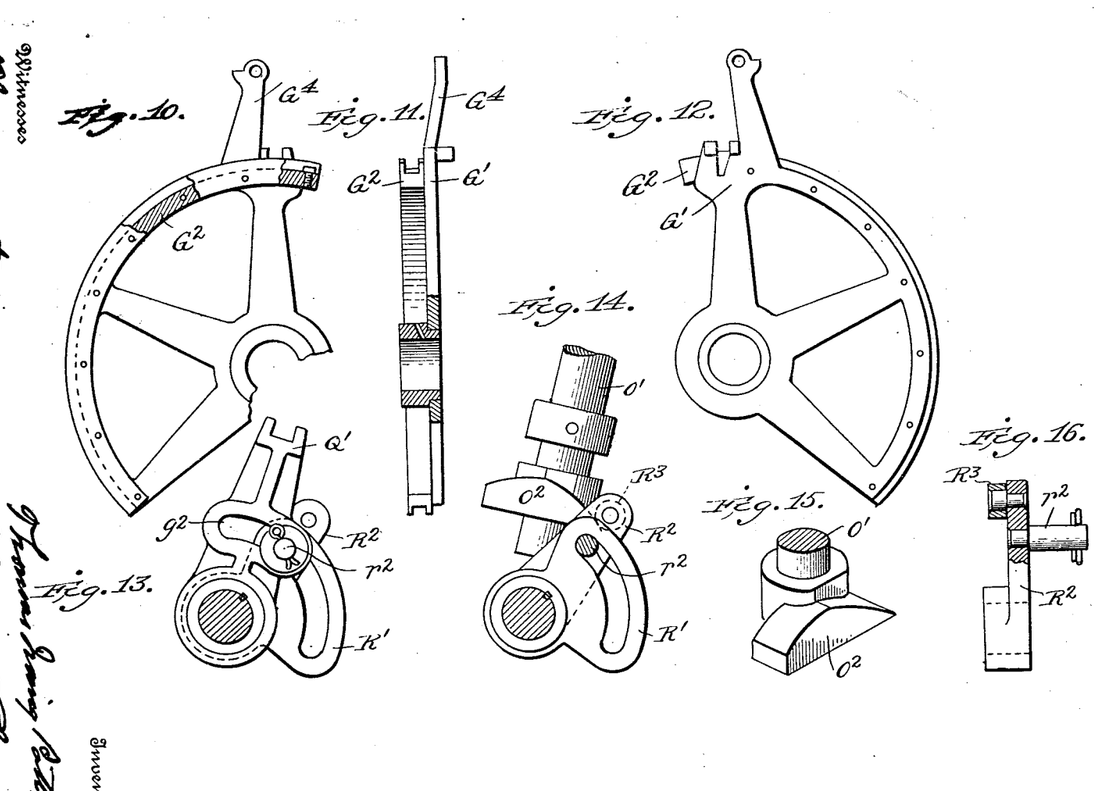
Figs. 10, 11 and 12 are elevations, partly broken away, of one of the spacer segments or arms and sheave segment adapted to be moved thereby for determining the position of the selector or control device in one direction.
Fig. 13 is a sectional elevation showing one of the ejector levers, with its actuating segment and arm for depressing the coupling mechanism and selector pins.
Fig. 14 is a detail showing the actuating segment and arm of Fig. 13, together with the depressing cam with which the arm coöperates.
Fig. 15 is a detail perspective view of the cam.
Fig. 16 is an edge elevation partly broken away of the arm shown in Figs. 13 and 14.

One of the slotted segments keyed to the shaft E is utilized as a part of the driving connection for depressing the pins N, and inasmuch as the pins must be depressed preliminary to the movement of the ejecting slide or the arm for operating the ejecting slide, this segment which is lettered R', Figs 1, 13 and 14, is made with a somewhat shorter slot therein, and the pin $r^2$ in this instance is mounted in a depressor arm $R^2$, journaled on the shaft and having near its outer end an anti-friction roller or pin $R^3$, which is adapted to ride over the cam $O^2$, on the shaft O'. The depressor arm is shown in detail in Fig. 16, and its coöperative position in connection with the cam $O^2$ is clearly indicated in Fig. 14. The slot in the segment R' is of such length that at the proper moment in the operation of the machine, the pin $r^2$ with the arm in which it is mounted, will be advanced to depress the pins N, and in order that the ejector arm Q' may remain at rest until the pins are depressed, the said arm Q' is provided with a slot $q^2$ in which the end of the pin $r^2$ works, said slot $q^2$ being of such length that the pin will move the arm $q'$ after the cam has been depressed and at substantially the same instant that the other arms begin their movement.

For elevating the pins N together with the frame O and shaft O' a coil spring indicated at S in Fig. 5 may be employed, and the frame O is conveniently kept in proper alinement or held against angular movement about the axis of the shaft O' by a guide pin S', although it will be understood that the shaft O' might be of irregular cross section, as it is in effect a sliding frame having no movement of rotation.

The coin ejecting slides P' work in guideways T in the bottom of the coin stacks or receptacles, and are adapted to advance only a relatively short distance, inasmuch as in the preferred construction the coins are supported on segmental ledges T', Fig. 3, which will permit a coin to escape when moved forwardly a relatively short distance, but will constitute an effective support for the pile of coins above the bottom coin, which is being advanced. The coin slides or ejectors for the stacks C, C, are each adapted to discharge one coin or silver dollar, while the slide or ejector for the stack C' is adapted to discharge two silver dollars at each operation. The ejector for the five dollar stack is adapted to discharge a single coin at each operation. With this construction, if all of the ejectors or slides are operated simultaneously, nine dollars in value will be ejected and by the operation of the proper individual ejectors any number of dollars of a value less than nine may be ejected.

A transaction involving the use of the machine may be briefly described as follows: A customer making a $2 purchase, hands the merchant a five dollar gold piece. The merchant deposits the five dollar gold piece in the proper stack, depresses the No. 5 deposit key and the No. 2 purchase key. Upon drawing forward on the handle E' the segments G, G', are advanced until their dogs engage and coöperate with the depressed keys. In performing this movement the key locking mechanism has been made effective by the advance of the lever K and the securing of the same by the latch L, so that no other key can be operated during the manipulation of the machine. The movement of the segment G rotates the shaft H and through it the selector and, simultaneously, the movement of the segment G' moves the selector longitudinally of its axis, whereby the proper apertures are brought beneath the pins M, for returning to the customer $3 in change. By reference to Fig. 6, it will be seen that at the intersection of the transverse dotted line 5 (deposit key) and the longitudinal dotted line 2 (purchase key) two apertures are in position for permitting the depression of pins which will lock the coin ejecting slide for the stack C' to its actuating arm, and the coin ejecting slide for one of the stacks C to its actuating arm. Further movement of the shaft E causes the depression of the pins N and the locking of the said slides to their actuating arms while the slides for the other stacks are held in their retracted position by their locking pins or shoulders. Continued movement of the shaft E advances the coin ejecting slides and discharges $3 through the coin chute to be returned to the customer when the transaction is complete, and the handle E' may be returned to its initial position so as to restore all of the parts.

If, for any reason, it should be desired to release keys which have been actuated, without actuating other keys, this may be accomplished by manipulation of the key lock D, and, conveniently, a bell crank release key U is mounted at the lower end of the groups of keys, which the merchant may manipulate so as to move the key lock D upwardly and thereby release any key which may have been depressed.

Having thus described my invention what I claim is:—

1. In a machine such as described, the combination with a selector movable in two directions at substantially right angles to each other and an operating shaft and handle, of independent driving connections intermediate the shaft and selector for moving the selector in each direction, respectively.

finger keys, and means controlled by the keys for disconnecting the driving connections and thereby determining the extent of movement imparted to the selector in each direction.

2. In a machine such as described, the combination with a selector movable both angularly and axially and an operating handle and shaft, of separate driving connections between said shaft and selector, one for moving the selector axially and the other for moving it angularly, two groups of keys, and means controlled thereby for disconnecting the driving connections between the shaft and selector, one group of keys thereby determining the angular and the other group the axial movement of the selector.

3. In a machine such as described, the combination with a selector movable both angularly and axially, and an operating shaft and handle, of separate driving connections between said shaft and selector, one for moving the selector axially and the other for moving it angularly, and key controlled means for disconnecting the driving connections independently of each other, whereby the extent of movement in each direction may be determined.

4. In a machine such as described, the combination with a selector movable both angularly and axially, and an operating shaft and handle, of separate driving connections between said shaft and selector, one for moving the selector axially and the other for moving it angularly, key controlled means for disconnecting the driving connections between the shaft and selector, and means for locking the selector against movement when disconnected from the operating shaft.

5. In a machine such as described, the combination with a selector movable both angularly and axially, and an operating shaft and handle, of separate driving connections between said shaft and selector, one for moving the selector axially and the other for moving it angularly, and key controlled means for independently disconnecting said driving connections and simultaneously locking the selector against further movement in the direction controlled by the disconnected driving connection.

6. In a machine such as described, the combination with a selector movable both angularly and axially, an operating shaft and handle, and separate driving connections between said shaft and selector, one for moving the selector axially and the other for moving it angularly, of groups of keys, and means controlled by all of the keys of each group for disconnecting a driving connection between the shaft and selector independently of the other group of keys and driving connection, substantially as described.

7. In a machine such as described, the combination with a selector movable both angularly and axially, an operating shaft and handle, and separate driving connections between said shaft and selector, one for moving the selector axially and the other for moving it angularly, of two groups of keys, means controlled by the keys of each group for disconnecting one of said driving connections, said means embodying a pivoted key engaging dog, and a locking bolt interposed in the driving connections and controlled by said dog.

8. In a machine such as described, the combination with a selector movable both angularly and axially, an operating shaft and handle, and separate driving connections between said shaft and selector, one for moving the selector axially and the other for moving it angularly, of two groups of keys, means controlled by said keys for disconnecting the driving connections, and means for locking the keys during the movement of the shaft and selector.

9. In a machine such as described, the combination with the selector movable both angularly and axially, an operating shaft and handle and driving connections between said shaft and selector for moving it angularly and axially, of separate groups of keys controlling the angular and axial movements of the selector respectively, and a key locking mechanism controlled by the shaft, whereby during the operation of the shaft and selector the keys are locked against operation.

10. In a machine such as described, the combination with the cylindrical selector, a rotary shaft on which the selector is mounted to move longitudinally, an operating shaft and driving connections interposed between the operating shaft and selector shaft and between the driving shaft and selector, whereby the selector may be moved both angularly and axially, said driving connections each embodying concentric segments, one carried by the shaft, and the other loosely journaled thereon, of locking bolts for connecting the concentric segments for unitary movement, dogs controlling said bolts, and two groups of keys, the keys of each group being adapted to coöperate with one of the dogs, whereby the driving connections between the operating shaft and selector may be disconnected.

11. In a change making machine, the combination with a cylindrical selector movable both angularly and axially, money discharging mechanism and pins controlling the actuation of the money discharging mechanism and adapted to coöperate with the selector in determining the amount of money discharged, of a driving shaft, independent connections intermediate the driving shaft and selector for moving the selector angularly and axially, respectively, and two series of keys, one series for disconnecting the driving connection controlling the axial movement of the selector, and the other series for disconnecting the driving connection controlling the angular movement of the selector.

12. In a change making machine, the combination with a selector movable both angularly and axially, money discharging mechanism, pins controlling the actuation of the money discharging mechanism, and adapted to coöperate with the selector in determining the amount of money discharged, and an operating shaft, of separate driving connections between the operating shaft and selector for moving the selector angularly and axially, respectively; each of said driving connections embodying concentric segments, a locking bolt for connecting said segments and a dog controlling said bolt, and two groups of keys, the keys of each group being adapted for movement into the path of one of the locking dogs, whereby the driving connections between the operating shaft and selector are controlled and the movements of the selector may be arrested at predetermined points.

13. In a change making machine, the combination with the cylindrical selector movable angularly and axially, and money discharging mechanism controlled by the selector, of an operating shaft, arms mounted on said shaft and having a limited movement independently of the shaft for operating the money discharging mechanism, independent driving connections intermediate the shaft and selector for moving the selector angularly and axially, respectively, independent groups of keys and means controlled by the keys of each group for disconnecting one of the driving connections between the shaft and selector, whereby the selector may be positioned and a continued movement effect the operation of the money discharging mechanism.

14. In a change making machine, the combination with the money discharging mechanism, an operating shaft, arms for operating the money discharging mechanism mounted on said shaft and having a limited movement independently thereof, a selector and operating connections independent of the arms between said shaft and selector, of pins coöperating with the selector, means actuated by said pins for controlling the connections between the money discharging mechanisms and the operating arms on the shaft, a group of keys, and means controlled by said keys for disconnecting the driving connections between the shaft and selector.

15. In a change making machine, the combination with the money discharging mechanism embodying a plurality of slides, an operating shaft, arms mounted on said shaft and having a limited movement independently thereof, and means whereby the slides and arms may be connected for movement in unison with each other, of a selector movable angularly and axially, independent driving connections between the shaft and selector, pins coöperating with the selector for controlling the connections between the slides and arms, and two groups of keys with means controlled by each group for disconnecting one of the driving connections between the shaft and selector.

16. In a change making machine, the combination with the operating shaft, arms loosely journaled thereon, segments carried by the shaft and coöperating with the arms for moving said arms during a portion of the movement of the shaft, money discharging mechanism embodying slides operated by the arms on the shaft, and means controlling the connections between said slides and operating arms embodying spring pressed pins, of a cylindrical selector having apertures therein for said pins, and a driving connection independent of the arms between said shaft and selector for positioning the selector with respect to the pins.

17. In a machine such as described, the combination with a rotary selector shaft, a selector mounted to move longitudinally on said shaft, and pins coöperating with the selector, of selector operating machanism embodying an operating shaft, a gear segment, and a sheave segment journaled on the operating shaft, a pinion on the selector shaft meshing with the gear segment, and a flexible connection intermediate the sheave segment and selector, and key controlled means for connecting the segments and shaft whereby the keys determine both the angular movement and the axial movement of the selector.

18. In a machine such as described, the combination with a rotary selector shaft, and selector mounted to rotate with and move longitudinally of said shaft, of an operating shaft, independent gear and sheave segments journaled on the operating shaft, gear connections between the gear segment and selector shaft, and a flexible connection intermediate the sheave segment and selector, locking bolts for connecting said segments and shaft for unitary movement, and two independent groups of keys, the keys of each group being adapted to control the locking bolt for one of the segments.

19. In a change making machine, the combination with the selector, selector shaft and pins for coöperation with the selector, of selector operating mechanism embodying an operating shaft, two sets of concentric segments, one segment of each set being fast and the other loose on the shaft, connections between the loose segments and selector, whereby the selector is moved angularly and axially, locking bolts for connecting the loose and fast segments, dogs controlling said bolts, and two groups of keys, the keys of each group being adapted to be projected into the path of one of the dogs, whereby the concentric segments will be disconnected and the movements of the selector determined.

20. In a machine such as described, the combination with the selector, oscillatory operating shaft, connections between said operating shaft and selector for moving the selector both axially and angularly, and finger keys having projections thereon, of a key locking plate having apertures for the projections on the keys, a locking lever for preventing the operation of said key locking plate, a catch for said lever, and a part movable with the shaft for releasing the catch when the shaft is in normal position.

21. In a change making machine, the combination with a plurality of coin stacks or receptacles, ejecting mechanism located in proximity to the bases of the stacks, and controlling mechanism for the ejectors, of two sets of keys arranged in parallel rows at one side of the receptacles, one set for determining the positioning of the ejector controlling mechanism in accordance with the amount of money received, and the other set for determining the position of said mechanism in accordance with the value of a purchase, whereby the difference between the amount received and the value of a purchase may be ejected from the stacks, and an operating handle located on the opposite side of the key board from the stacks with connections whereby the ejectors are operated and the operated keys of both sets returned to normal positions.

22. In a change making machine, the combination with coin stacks or receptacles, two sets of keys arranged in parallel rows and located at one side of said receptacles, and a coin chute for receiving the coins from the receptacles and conducting them to a single point of delivery, of ejecting mechanism located in proximity to the base of the stacks, selecting mechanism governed by the keys in both sets of keys to select ejectors for ejecting coin equaling in value the difference between the operated keys of the two sets, and an operating handle with operating connections between said handle and ejecting mechanism, said handle being located on the opposite side of the key board from the coin receptacles.

THOMAS IRVING POTTER.

Witnesses:
  N. M. Deering,
  E. L. Deering.

---

Copies of this patent may be obtained for five cents each, by addressing the "Commissioner of Patents, Washington, D. C."